United States Patent
Nakamura

[11] 4,013,347
[45] Mar. 22, 1977

[54] MOVABLE FILTER OPTICAL SYSTEM FOR PROVIDING IMPROVED OPTICAL TRANSMISSION CHARACTERISTICS

[75] Inventor: Akiyoshi Nakamura, Sakai, Japan
[73] Assignee: Minolta Camera Kabushiki Kaisha, Osaka, Japan
[22] Filed: May 2, 1975
[21] Appl. No.: 573,917

[30] Foreign Application Priority Data
May 4, 1974 Japan .............................. 49-50020

[52] U.S. Cl. ................................ 350/188; 350/197; 350/206; 354/296
[51] Int. Cl.² ....................... G02B 5/02; G03B 3/00
[58] Field of Search .......... 350/188, 197, 205, 206; 352/85, 91 C; 355/52; 354/296

[56] References Cited
UNITED STATES PATENTS

| | | | |
|---|---|---|---|
| 236,731 | 1/1881 | Sutter | 354/296 |
| 1,202,223 | 10/1916 | Redfield | 350/206 |
| 1,370,885 | 3/1921 | Frederick et al. | 350/188 |
| 2,233,591 | 3/1941 | Dulavits | 350/188 |
| 2,972,931 | 2/1961 | Roob | 354/296 |
| 3,603,676 | 9/1971 | Laewe | 350/188 |
| 3,774,992 | 11/1973 | Steiner | 354/296 |
| 3,784,290 | 5/1972 | Strobel | 350/188 |
| 3,843,235 | 10/1974 | Mino | 350/205 |

Primary Examiner—John K. Corbin
Assistant Examiner—Conrad Clark
Attorney, Agent, or Firm—Jackson & Jones Law Corporation

[57] ABSTRACT

An image forming optical system, such as a photographic objective lens assembly is provided with a movable optical element. The movable optical element is designed and mounted so that it can optically interact with the transmission rays of the optical system or permit the rays to pass unaffected. The optical element can be a filter capable of improving the image forming characteristics of target object image to provide an advantageous soft focus, for example, as a portrait lens system or to provide a soft defocussed image. The optical filter element can have a central region capable of passing the converging or diverging transmitted rays through the optical system substantially free of refraction and a peripheral region capable of decreasing the transmitted image point intensity of rays transmitted therethrough. The optical filter element can be movable along the optical axis within a predetermined range of movement. This range of movement includes one position wherein the central region of the optical filter element will transmit all the incident rays. Various types of optical filters can be used such as filters with a peripheral region shaded to vary transmission intensity or given a refractive power.

23 Claims, 37 Drawing Figures

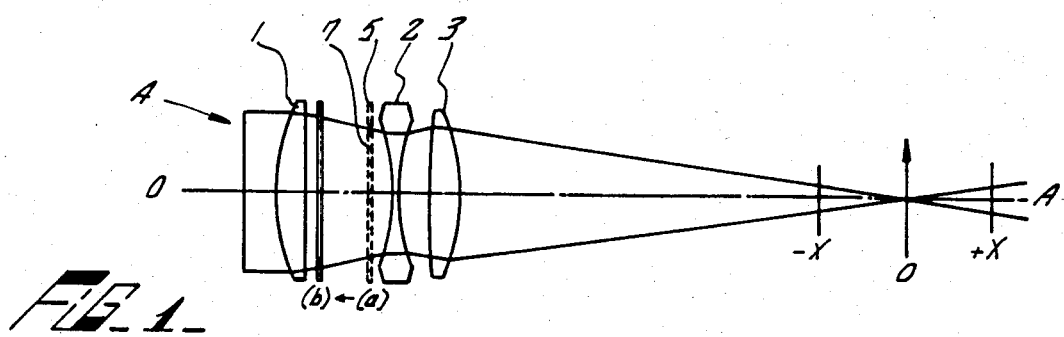
FIG._1_
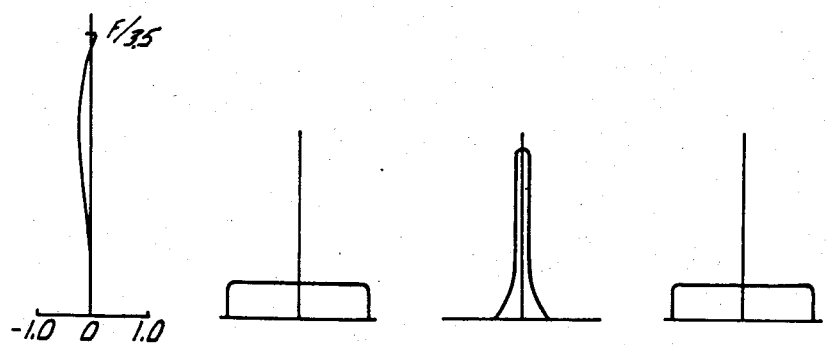
FIG.2A_  2B  2C  2D
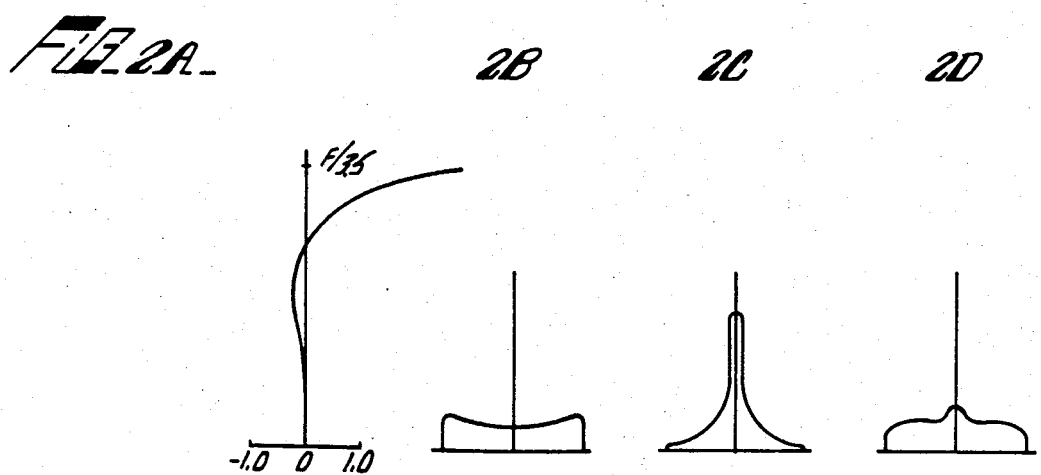
FIG.3A  3B  3C  3D
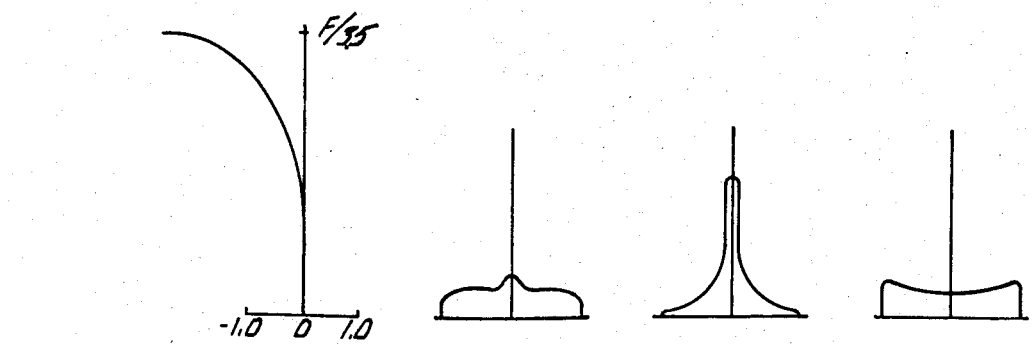
FIG.4A  4B  4C  4D

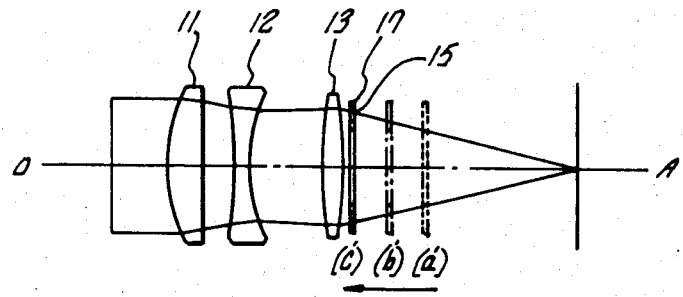
FIG. 6.
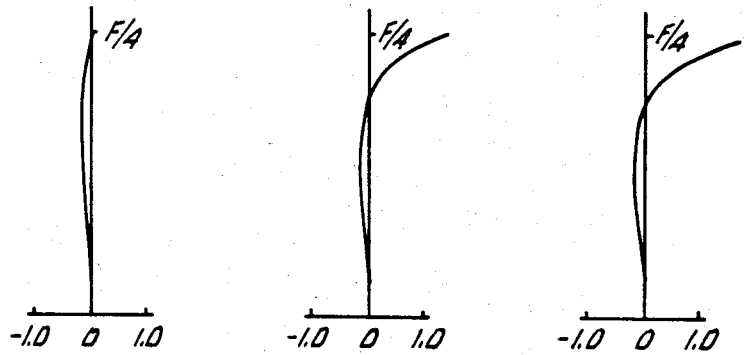
FIG. 6A.   6B.   6C.
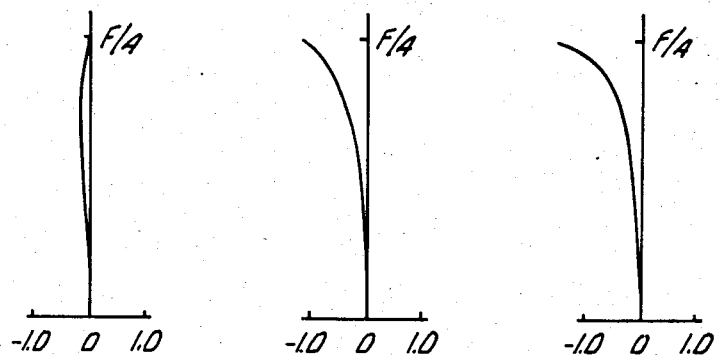
FIG. 7A.   7B.   7C

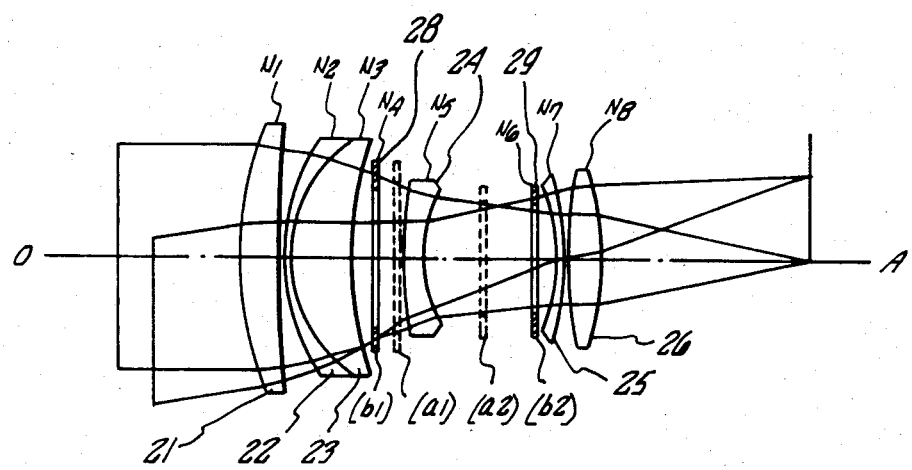
FIG_8_
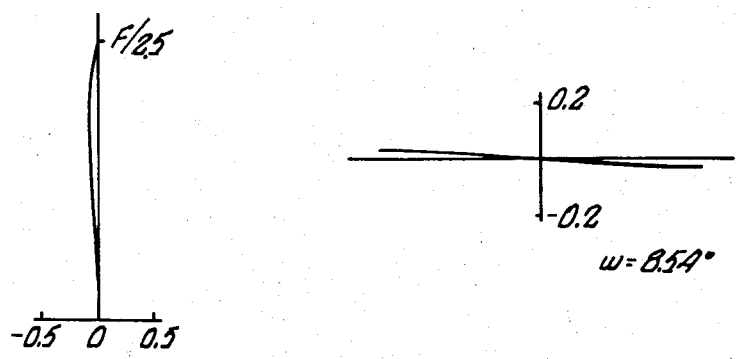
FIG_9_  FIG_10_
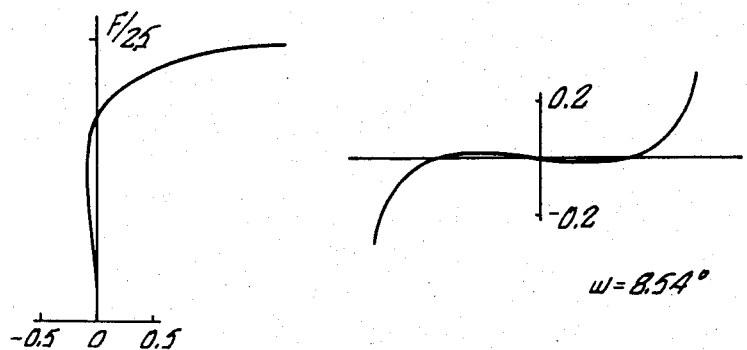
FIG_11_  FIG_12_

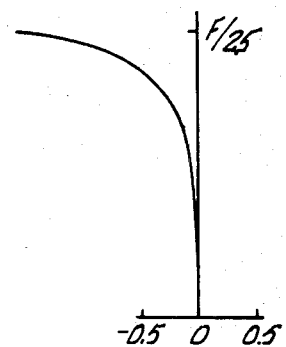
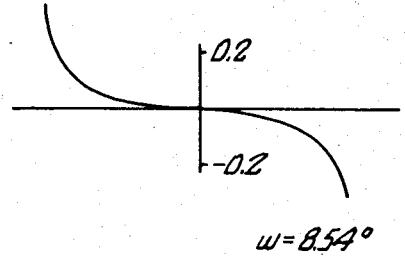
FIG._13_            FIG._14_
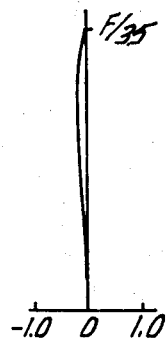
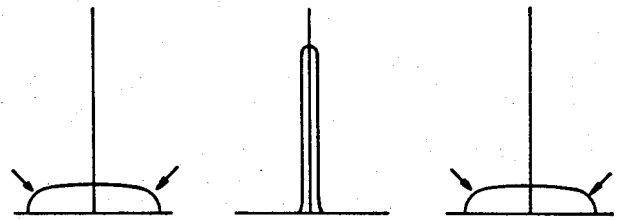
FIG._15A_    15B    15C    15D
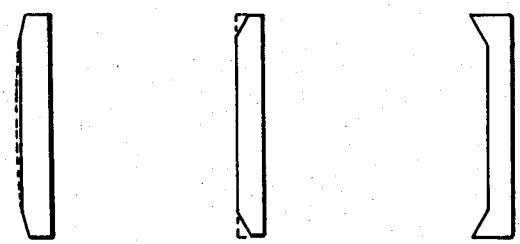
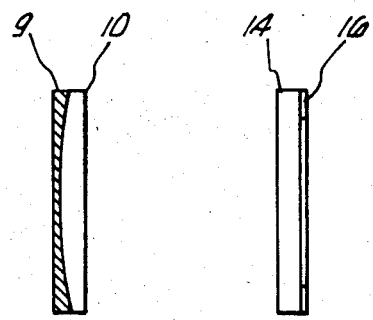
FIG._16_   FIG._17_   FIG._18_   FIG._19_   FIG._20_

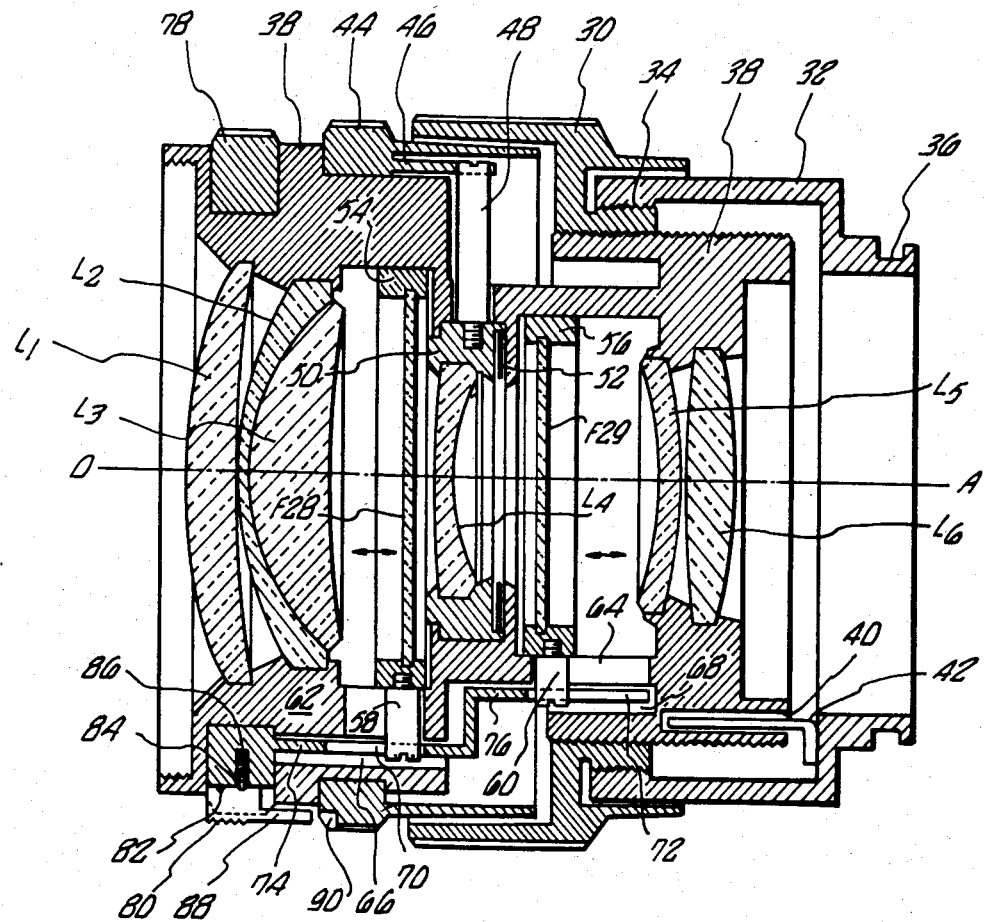
FIG_21.

MOVABLE FILTER OPTICAL SYSTEM FOR PROVIDING IMPROVED OPTICAL TRANSMISSION CHARACTERISTICS

BACKGROUND OF THE INVENTION

1. Field of the Invention

The present invention relates generally to an image forming optical system and more particularly to means for improving the image forming characteristics with a unique filter structure and mounting.

2. Description of the Prior Art

The desirability of improving the imaging characteristics of various lens systems are well known in the prior art. For example, it is known to use a soft focus filter to produce a faithful but soft tone portrait in the field of photography. Frequently, optical elements are permanently mounted in the lens barrel, traversely removable from the lens barrel or attached to the end of the lens barrel.

Also, it is highly desirable to improve the images that are not conjugate to the image or film plane. For example, the background objects behind a principal target object must supplement or complement the photograph of the principal image while still retaining a general outline that is softly blended.

An image can be defined by a spatial distribution of illumination existing in a determined plane which is the plane of the image. It has been known to determine the image properties of an optical system not only by the phase of the pupil function but also by its amplitude transmittance. For any optical system, a family of curves may be established which express the transmission factor as a function of the spatial frequency or wavelength. By the use of Fourier transformation the imaging properties of an optical system can be measured by the optical transfer function. Any optical system and therefore any optical instrument, may thus be considered as a transmitter of signals corresponding to sinusoidal functions in which the function is the luminance of a point and the variable is the position of the point. It is known that by decreasing the transmitted image point intensity of a defocussed image the photographic characteristics of the image can be improved. This improvement can be realized in other optical systems than cameras, such as microscopes and telescopes.

The prior art has suggested various ways of improving the optical transfer function of a defocussed optical system such as the Mino et al U.S. Pat. No. 3,843,235 wherein a filter is provided having a characteristic of providing an optical transfer function of a monotonously decreasing function in accordance with an increase in spatial frequency. Further the optical transfer function must remain essentially positive.

Various optical systems have been suggested for providing a filter to provide a desired image such as the Tsujiuchi U.S. Pat. No. 3,045,530, Marechal et al U.S. Pat. No. 3,090,281, Sayanagi U.S. Pat. No. 2,959,105, Nomarski U.S. Pat. No. 3,476,457, and Land U.S. Pat. No. 3,397,023.

As noted above, a photographic lens assembly is generally evaluated in accordance with the sharpness of a focussed image on a film plane. However, the commercial acceptability of a photographic picture frequently requires images of photographic objects located both frontwards and rearwards of a sharply defined target photographic object to have a pleasing natural appearing blurred image. In some cases it is even desired to provide a blur or soft defocussed image for the target photographic object itself. The Mino et al patent mentioned above, is representative of one such apodization optical system.

The combining however, of such a filter element in a commercial lens system has caused problems, for example, in focussing and setting the diaphragm aperture. Generally, the optical filters have been directly attached to the exterior lens or lens barrel or affixed at one position in the interlens space of the optical system. The prior art has not provided a versatile commercially acceptable lens in a compact mode which permits a selective utilization of a filter optical element.

SUMMARY OF THE INVENTION

The present invention provides an improvement in an optical system for forming images of objects. In particular, a movable optical element is movably mounted along the optical axis so that it can either actively alter the transmission properties of the optical system or remain passive and permit the transmission rays to pass unaltered. The present invention is highly useful in photographic objective lens assemblies for the improvement of defocussed images. The optical lens assembly of the present invention can incorporate an optical filter element having a central region capable of passing the transmitted rays substantially free of refraction and a peripheral region having a filter characteristic of improving the defocussed image by decreasing the transmitted point intensity of the defocussed image. The present invention can also provide a soft focus image for the target photographic object. Mounting means are provided for moving the optical filter element relative to the lens along the optical axis for a predetermined range of movement. This range of movement advantageously includes one position wherein the central region encompasses the entire bundle of rays or flux transmitted through the objective lens assembly to permit the formation of substantially unfiltered images. At other positions along the range of movement, the peripheral region can intersect and decrease the transmitted image point intensity or distribution, for example, proportional to the radial direction off the optical axis. Various forms of optical filter elements can be utilized such as those having an absorbing coating or refractive power.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 1 is a schematic cross sectional view of an optical system of the present invention;

FIG. 2 are plots of a spherical aberration curve and the distribution of in point image intensity for the embodiment of FIG. 1 wherein FIG. 2A plots the spherical aberration curve, and FIGS. 2B, 2C and 2D represent the distribution in point image intensity for respectively a defocussed image behind the image plane of a background object, an image of the target photographic object on the image plane and an image in front of the image plane of a foreground object;

FIG. 3 provides a spherical aberration curve and plot of the distribution in point image intensity for the embodiment of FIG. 1 wherein the optical element is at position (b) and has a divergent refractive power on a peripheral edge portion wherein FIG. 3A plots the aberration curve of the lens system, and FIGS. 3B, 3C and 3D represent respectively the distribution in point image intensity for a foreground defocused image, an image on the focal plane and a background defocussed image;

FIG. 4 discloses a spherical aberration curve and in point image intensity distribution for another embodiment of the present invention, wherein the optical element is located at position (b) in FIG. 1 and has a convergent refractive power on a pheripheral edge, wherein FIG. 4A plots the aberration curve of the optical system, and FIGS. 4B, 4C and 4D represent respectively, the image point intensity distribution for a foreground defocussed image, an image on the image plane and a background defocussed image;

FIG. 5 is a schematic cross sectional view of another embodiment of the present invention;

FIG. 6 is a series of spherical aberration curves wherein the optical element of the embodiment of FIG. 5 has a divergent refractive power on the peripheral edge portion wherein FIG. 6A represents the optical element at position (a), FIG. 6B represents the optical element at position (b), and FIG. 6C represents the optical element at position (c);

FIG. 7 is a series of graphs showing the spherical aberration curves for the embodiment of FIG. 5 wherein the optical element has a convergent refractive power on the peripheral edge portion, wherein FIG. 6A represents the spherical aberration curve for the optical element in position (a), FIG. 6B is for position (b) and FIG. 6C is for position (c);

FIG. 8 discloses a schematic cross sectional view of a third embodiment of the present invention;

FIG. 9 is a graph of the spherical aberration curve for the optical system of FIG. 8 with the two optical elements in position (a1) and (a2) respectively;

FIG. 10 is a graph of the coma curve for the same position as FIG. 9;

FIG. 11 is a graph of the spherical aberration curve wherein the two optical elements have a peripheral divergent refractive power and are located respectively in positions (b1) and (b2);

FIG. 12 is a graph of the coma curve for the same position as FIG. 11;

FIG. 13 is a graph of the spherical aberration curve wherein the two optical elements have a peripheral convergent refractive power and are in the respective positions (b1) and (b2);

FIG. 14 is a graph of the coma curve for the positions of FIG. 13;

FIG. 15 is a series of curves for the embodiment of FIG. 1 wherein, the optical element has a light absorbing characteristic on the peripheral edge portion, wherein FIG. 15A is a graph of the spherical aberration curve and FIGS. 15B and 15C represent repectively the in point image intensity distribution for a background defocussed image, an image on the focal plane and a foreground defocussed image;

FIGS. 16 through 20 disclose some of the various applicable embodiments of an optical filter element for the present invention and FIG. 21 is a cross sectional view of a lens system corresponding to FIG. 8

BRIEF DESCRIPTION OF THE PREFERRED EMBODIMENTS

The following description is provided to enable any person skilled in the optical art to make and use the invention and sets forth the best modes contemplated by the inventor of carrying out his invention. Various modifications however, will remain readily apparent to those skilled in the art, since the generic principles of the present invention have been defined herein specifically to provide an optical lens system that can be manufactured in a relatively economical manner.

In one mode the present invention provides an optical lens system that is capable of varying image formations both on the film plane and off the film plane. Generally, at least one optical filter element will be positioned along the optical axis either between photographic objective lenses or outside the lenses. The center of the optical filter element will be positioned on the optical axis of the lens system and will generally have a center region or portion that is substantially symmetrical about the optical axis. An outer or peripheral edge portion or region will generally have the characteristic of providing either a refraction characteristic to the transmitted rays or a variation in the transparency or transmittency of the rays.

The optical filter element is capable of varying the distribution in point image intensity and in this regard reference is made to the article "Improvement in the OTF of a Defocussed Optical System through the Use of Shaded Apertures" by Mino and Okano, Applied Optics, Vol. 10, No. 10, Page 2219, October 1971, which discloses some supplemental apodization theory which is incorporated herein by reference. Reference is also made to "The Resolving Power of a Coated Object" Journal of the Optical Society of America, Vol. 39, No. 7, Page 553, July 1949 for further discussion of relevant background theory.

The present invention can be advantageously utilized with the optical filter described in U.S. Pat. No. 3,843,235 and incorporated herein by reference. The present invention further has the capability of providing an optimum soft focus target image.

With respect to the terminology utilized in the present invention, the term "defocussed image" refers to an image that is formed in a photographic objective lens system at a distance off the focal plane. Generally, the optical filter of the present invention must be positioned in a divergent or convergent light ray flux of the lens system. For example, if a transparent parallel flat plate is moved along the optical axis relative to the lens of the system, and the various aberration of the objective lenses of the systems have been compensated for, then the shifting of the parallel flat plate will not exert any influence on the aberration characteristics of the objective lens. If this parallel flat plate is given however, a refractive characteristic or coated to vary the transmission characteristics, on the peripheral region, then the marginal converging or diverging light rays passing through the peripheral region of the plate will necessarily be affected by the refractive power or transmittency of that plate. When an optical filter element, for example, in the form of a plate is shifted along the optical axis, then the mass of light rays or light flux passing through the circumferential or peripheral edge portion will vary according to the relative position of the filter element. Accordingly, the variation and distribution of the image point intensity will depend upon the quantity or mass of light rays transmitted through the circumferential or peripheral edge portion of the optical filter plate.

To maximize the effect of the optical filter element it is preferred that the filter element be positioned adjacent the lenses where the light rays or light flux is in a highly convergent or highly divergent condition and the relative spacing of the lenses should permit the optimum movement of the filter element along the optical axis. Obviously, the particular design parameters of the filter will be subjectively determined by the particular optical system. Advantageously, the optical filter element must have a passive position along the optical axis to permit the independent utilization of the optical system apart from the filter. These features also are provided in a compact single lens barrel design.

Referring to FIG. 1, a conventional objective lens system four consisting of a first convex lens 1, a second biconcave lens 2, and a third convex lens 3 is provided. The filter element 7 of the present invention is positioned in the converging flux of light between the first lens 1 and the second lens 2. The center of the optical filter element 7 is located along the optical axis of the optical system. The back focal length of the system is at position 0 and is represented by an arrow image. A defocussed image position is provided respectively at +X and −X distances off the focal plane.

Generally, an out of focus image or defocussed image, for example, a point source, will be formed as a disc or circular patch of uniform illumination and can be described as a circle of confusion. The defocussed image being a mass of circles of confusion.

The optical filter element 7 has a central region capable of transmitting the rays or flux of light without changing any of the optical systems characteristics imparted to the light flux, such as ray deviation or variation in intensity. The filter optical element 7 further has a peripheral or circumferential edge portion that is capable of varying the light ray characteristics of the rays transmitted through this region. For example, if the optical element 7 is to be utilized to provide a soft focus lens system, the peripheral portion 5 can be advantageously given a spherical or aspheric shape to provide a desired refractive power to deviate the rays and maximize the soft focus characteristic of the composite image on the focal plane.

The particular shape of the filter element 7 is advantageously circular but it should be realized that other shapes can be utilized within the parameters of the present invention depending upon particular utilization of the optical lens system and the configuration of the light flux passing therethrough.

In FIG. 1, element 7 is disclosed in position (b) adjacent the first lens 1. In this position, the outer peripheral or marginal filter portion 5 is intercepting the converging flux of rays and imparting a filter characteristic to the final image. The phantom lines of filter element 7 located at position (a) disclose that the peripheral filter portion 5 is isolated from coacting with the corresponding peripheral rays of the light flux.

The lens system 4 can thus be advantageously utilized and focussed as if filter element 7 was not present without physically removing the filter element 7 as required by the prior art.

With the filter element 7 located in the flux of light rays which are converging due to the refraction of the first lens 1, the peripheral light rays will either be under corrected or over corrected by the filter for spherical aberration depending upon the converging or diverging power of the peripheral region 5. The end result is to provide a low contrast image that has been found to be highly desirable in a photographic system.

Generally, a good low contrast image will have an utmost sharp nucleus which is encompassed with a halo effect. An objective lens system is, however, designed to provide a sharp image with a minimum of aberrations. The blurred image of background objects surrounding the target photographic object is generally created in a soft focus lens system by under correcting spherical aberration. A foreground object located to form an image at, for example +X, is advantageously blurred by introducing over correction for the spherical aberration of the lens system, that is, by the use of a divergent refractive power filter. Conversely, a background image, for example at −X, has an advantageous blurred affect when a convergent filter element is utilized.

Referring specifically to FIG. 2A, a spherical aberration curve of the optical lens system 4 of FIG. 1 is disclosed with the optical filter element 7 located at position (a). As can be seen from FIG. 2A the total spherical aberration of the lens system is relatively minor. FIG. 2B discloses the transmission factor or the distribution in point image intensity of a defocussed image on the film plane 0 for a photographic object located behind or rearward of the principal target and correspondingly forming an image at a point −X as disclosed in FIG. 1. Thus, this image can be considered a defocussed image relative to the film plane located at 0 in FIG. 1. The distribution of in point image intensity of a defocussed image on the film plane 0 is shown in FIG. 2B.

FIG. 2D also discloses a distribution in point image intensity for a photographic object located in front of the principal target photographic object and forming an image at a point +X in FIG. 1. As can be seen from the comparison of FIG. 2B and FIG. 2D, the distribution in point image intensity for the defocussed image on the film plane is substantially the same for the lens system 4 when it transmits unfiltered transmission rays. Both the defocussed images of photographic objects located behind and in front of the principal target object, are rather widely spread blurred images of poor quality image without the provision of any sharp nucleus.

FIG. 2C discloses the distribution in point image intensity for an in focus image of the principal target photographic object. As can be seen from FIG. 2C, the distribution is relatively narrow and concisely defined, and represents an image that is sharply defined on the film plane and relatively free from any halo affect.

With the optical filter element 7 moved from position (a) to position (b) in the optical system 4 of FIG. 1, the total spherical aberration of the optical system 4 is altered. FIG 3A discloses a graph of the spherical aberration with the filter optical element 7 at position (b). In this example, the peripheral region of the filter optical element 7 has a divergent refractive power and as can be seen from the spherical aberration curve there is introduced an over correction of spherical aberration into the system. FIG. 3B discloses the distribution in point image intensity for an out of focus image of a background photographic object, with respect to the target object, with the optical element 7 at position (b). As can be seen, from FIG. 3B, the introduction of the divergent refractive power to the transmission rays will provide an out of focus or defocussed image which will have a relatively low intensity distribution across the center which would indicate a blurred image without any substance or nucleus to provide a faithfully defined outline of the subject. Thus, the background photographic object will not provide a good blurred image for photographing purposes.

The distribution in the in point image intensity for the target photographic object registering an in focus image on the film plane 0 is disclosed in FIG. 3C with the divergent filter element 7 at position (b). As can be seen from the in point image intensity curve, there is provided a good low contrast image with the nucleus position in the center and encompassed with a halo affect.

The effect of a divergent filter element 7 on a foreground object is disclosed in FIG. 3D. As can be seen from the point image intensity curve, a defocussed image with the filter element 7 at position (b) has a defined nucleus in the center and is surrounded by a halo which indicates a good naturally blurred image for photographic purposes. While FIG. 1 discloses the filter optical element 7, located in two positions it should be realized that the range of movement between these positions permits variations in the degree of filtering imposed upon the transmitted rays or light flux, thus adjustment can be effectuated particularly within the marginal light rays passing through peripheral filter region 5 to effectuate for example, a soft focussed image. The characteristic of the optical filter element 7 and its movable mounting within the lens system is particularly advantageous in a commercial lens system sold as a unit.

In the conventional soft focus lens the point image intensity distribution is generally arranged to provide a curve as shown in FIG. 3C. Problems however are created in attempting to focus the conventional soft focus lens system because of the halo image created. In addition, the intensity distribution characteristic for a point image is also determined by the diaphragm aperture size of the lens system as is well known in the prior art. Therefore, the formed image will be too dim if the diaphragm aperture is opened while the desired soft focussing affect would be insufficient with the diaphragm aperture set at a closed or restricted position. With the present invention, the optical filter element 7 is movable between a filtering range of positions and a passive position wherein the filter element 7 is effectively removed from influencing the transmission characteristics of the lens system. Accordingly, focussing can be easily accomplished with the optical filter element at, for example, position (a) in FIG. 1, since the focussed image can be clearly defined, for example, as shown in FIG. 2C. Once the desired focussing of the principal target object is accomplished, the filter optical element 7 can be moved to a desired position to obtain a soft focus image as shown in FIG. 3C. Finally, the amount of filtered marginal light rays which pass through the peripheral region 5 of the filter optical element 7 is variable in accordance with the movement of the optical element 7 to obtain an ideal soft focussed image at the desired set diaphragm aperture. For example, if the soft focussed image is found to be too dim at the set diaphragm aperture, the optical element 7 may be moved slightly backward towards position (a) in FIG. 1 to decrease the amount or quantity of marginal light rays which would pass through peripheral filter region 5. Thus, an ideal soft focussed image can be obtained at the desired set diaphragm aperture with a one piece lens barrel assembly.

Referring to the series of graphs in FIG. 4, a convergent refractive power optical filter element is utilized in the lens system of FIG. 1. FIG. 4A discloses that the correction for spherical aberration is inadequate due to the affect of the convergent refractive power of the peripheral region 5 of the filter element 7. FIG. 4B discloses the distribution in point image intensity for an out of focus or defocussed image of a background object with the filter element 7 at position (b). As can be readily seen, a defined nucleus is provided surrounded with a halo to provide a good blurred low contrast image. Thus, a convergent refracting power improves the defocussed image of a background object while a divergent refractive power improves the foreground object image as can be readily seen from a comparison of FIG. 4B with FIG. 3D.

FIG. 4C discloses the distribution in point image intensity for an in focus image of the target photographic object. The distribution curve is similar to that produced with respect to FIG. 3C and a good low contrast image with a soft halo affect is provided.

FIG. 4D discloses the distribution in point image intensity for a defocussed image of a foreground convex as a result of providing a convergent refractive power to the optical filter element 7. As can be seen FIG. 4D corresponds with FIG. 3B. The distribution intensity curve discloses that no nucleus is formed in the center and accordingly a clear contoured, doughnut shaped blurred image would be produced which would impair the image forming characteristics desired in photographs.

A second embodiment of the present invention is disclosed in FIG. 5 wherein an optical filter element 17 is located behind the third convex lens 13 on the image side of the lens system. A convergent lens 11 and a biconcave lens 12 form the other elements of the lens system. The optical filter element 17 is similar to the optical element 7 disclosed in the lens system of FIG. 1 in that it has a refractive power in its circumferential or peripheral edge portion 15 and is adapted to be shifted along the optical axis to assume positions (a'), (b') and (c') respectively. The family of graphs presented in FIGS. 6A, 6B and 6C disclose the spherical aberrations of the lens system with the optical element 17 having a divergent refractive power and assuming respectively the positions of (a'), (b') and (c'). As can be readily seen from FIG. 6A the filter optical element 17 is effectively removed from filtering any light flux through the system.

The respective spherical aberration curves of FIG. 6B and 6C disclose that progressively more light rays are being influenced by the divergent refractive power of filter 17. The resulting effect is, as if the optical designer had designed a progression of different types of lenses having various degrees of over correction for the spherical aberration. As can be appreciated from FIGS. 6B and 6C, the extent of the halo on the image may be controlled according to the position of the optical element 17 along the optical axis of the lens system. Thus, there may be obtained low contrast images with a varying degree of contrast.

The use of an optical filter element 17 with convergent refractive power is disclosed in the family of graphs shown in FIG. 7. FIGS. 7A corresponds to the position of the filter optical element 17 at (a') in FIG. 5, FIG. 7B discloses a spherical aberration at position (b') while FIG. 7C discloses the spherical aberration at position (c').

As can be seen from the previous two embodiments of the present invention, the amount of spherical aberration transmitted by an optical system can be changed or adjusted to produce a desired affect. It is however, difficult to develop the halo for an off axis flux of light about the optical axis in a symmetrical manner.

Referring to FIG. 8, a third embodiment of the present invention is provided wherein a symmetrical halo about the optical axis can be created. The lens system of FIG. 8 consist of six objective lenses 21 through 26 and two optical filter elements 28 and 29 positioned within the intra-lens spaces. Filter element 28 is positioned between the third lens 23 and the fourth lens 24, while filter element 29 is positioned between the fourth lens 24 and the fifth lens 25. Both of these optical filter elements 28 and 29 are mounted to be shifted from respective positions (a1) and (a2) to positions (b1) and (b2). When the optical filter elements 28, 29 are located respectively at positions (a1), (a2), none of the light rays or flux passes through the peripheral or circumferential edge portions of the filter elements and the overall lens system can be utilized for example for focussing purposes, as if the filter elements were not present within the intra spaces of the respective lenses. When the filter elements 28 and 29 are positioned respectively at positions (b1) and (b2), the transmitted light rays are altered, for example, by a refractive power and a low contrast image can be obtained.

The filter optical element 28 located at the position (b1) will produce a halo effect for the flux of light rays parallel to the optical axis in a symmetrical relationship with respect to the optical axis while at the same time, producing a halo affect on the under side of the flux of light rays off the optical axis.

The other optical filter element 29 when located in the position (b2) will produce a halo for the flux of light rays parallel to the optical axis in a symmetrical relationship with respect to the optical axis while producing a halo on the upper side of the flux of light rays off the optical axis. Thus, in the embodiment of FIG. 8, a halo affect can be produced in a symmetrical manner with respect to the optical axis or center of the image both with respect to light rays on the optical axis and for light rays off the optical axis. The result is a low contrast image of an improved quality. The actual mechanism for shifting the optical elements 28 and 29 from their respective positions (a1) and (a2) to (b1) and (b2) can be accomplished in a variety of ways. For example, the filter elements can be mechanically interlocked with a diaphragm or may be manually shifted directly to vary the amount of halo desired for the image.

FIG. 9 discloses the spherical aberration curve, while FIG. 10 discloses the coma curve, for the embodiment of FIG. 8 when the optical filter elements 28 and 29 are located respectively in the positions (a1) and (a2).

FIG. 11 discloses the spherical curve and FIG. 12 discloses the coma for the embodiment of FIG. 8 when the optical filter elements 28 and 29 are provided with a divergent refractive power on their circumferential edge portions and the filter optical elements are positioned respectively in the positions (b1) and (b2).

When the filter optical elements 28 and 29 are provided with the convergent refractive power in their circumferential edge portions and positioned respectively in the positions (b1) and (b2) the resulting spherical aberration can be seen in FIG. 13 and the coma can be seen in FIG. 14 from the aberration curves, FIGS. 11 through 14, an image halo for the flux of light off the optical axis can be created symmetrical with respect to the center of the image.

The preceding aberration curves and graphs of the distribution of in point intensity transmitted by the optical system were derived with the use of filter elements having a refractive power on their circumferential edge portion.

As mentioned earlier, it is possible to also coat the filter element with a light absorbing material. Referring to FIG. 15, a family of graphs are provided for an alternative embodiment of the present invention wherein the circumferential edge portion of the optical filter element 7 disclosed in FIG. 1 has a light absorbing filter characteristic. Since there is no refractive filter characteristic introduced into the transmitted rays of the optical system, the spherical aberration curve of FIG. 15A with the optical element 7 in position (a) is the same whether the optical filter element 7 is placed within the converging light flux or not. A comparison with FIG. 2A supports this analysis. As can be seen from FIG. 15C, the target photographic object produces an in focus image sharply defined. For objects that reside both in the foreground and background, relative to the target object, the respective distribution of in point image intensity disclosed in FIG. 15B and 15D disclose a favorable monotonically decreasing optical transfer function to provide a desirable soft defocussed image having a generally defined center surrounded with a halo. Thus, the optical filter element 7 provided with a light absorbing characteristic can improve the defocussed images for both foreground and background objects with respect to the target photograph object as distinquished from the previous embodiments wherein only a refractive power was given to the optical filter element 7. Accordingly, the embodiment of FIG. 15 can provide a sharply defined target photographic object with an improved soft defocussed image for foreground and background objects.

FIGS. 16 through 20 are cross sectional views of various embodiments of filter optical elements that can be utilized in the present invention. FIGS. 16 and 17 disclose the shape of an optical filter element having a positive refractive power, that is, a convergent power, on the circumferential edge portion. The filter element of FIG. 16 can be made from the convex-flat lens which has its face ground into a parallel flat plate across its central area to leave the desired circumferential edge portion with the appropriate refractive power. The optical filter element of FIG. 17 can be made from a flat parallel surface plate which is appropriately modified to provide a circumferential portion with the desired refractive characteristic. As can be readily appreciated, the filter element of FIG. 17 can be manufactured relatively easily as compared with a lens having a graduated thickness reduction across its circumferential edge.

The optical filter element shown in FIG. 18 is also made of a flat parallel plate and has a circumferential portion with a progressively increasing thickness to provide a negative or divergent refractive power. As can be readily appreciated the filter elements need not be made of glass but can be made of synthetic resins, such as an acrylic resin and other plastics and can further be advantageously molded.

It is also possible for the optical filter element to have an aspheric surface on its circumferential portion to provide a specific refractive power. The aspheric surface can be defined in a close approximation by the following formula:

$$X = C_2 Y^2 + C_4 Y^4 + C_6 Y^6 + C_8 Y^8 + C_{10} Y^{10}$$

(wherein $X$ is the deviation from a parallel flat plate, $Y$ is the distance from the optical axis and $C_2$ through $C_{10}$ are appropriate coefficients of the aspheric surface.)

The specific design theory for aspheric surfaces is known in the prior art and need not be provided herein for an understanding of the present invention, reference however, is made to "On the Design of Optical Systems Containing Aspheric Surfaces" by Meiron, Journal of the Optical Society of America, Vol. 46, No. 4, Page 288, April 1956.

FIGS. 19 and 20 disclose optical filter elements having a light absorptive characteristic, i.e., variation in transmission capabilities on the circumferential edge portion instead of a refractive power. In particular, the filter element shown in FIG. 19 comprises a flat concave lens-shaped ND filter 9 attached to a flat convex lens 10 having the same curvature as that of the ND filter 9 so that the refractive power of the individual lenses are nullified across the entire optical element.

The optical filter element shown in FIG. 20 comprises a transparent parallel flat plate 14 having a circumferential area 16 coated with a material having a low transmission characteristic, for example aluminum. The aluminum can be affixed or plated by vacuum evaporation onto the substrate 14. Other coating materials could be utilized such as a material having a diffusive characteristic to cause a scattering of the transmission rays.

FIG. 21 is a cross sectional view of a lens barrel of the embodiment of FIG. 8 of the present invention. A focussing ring 30 is fastened to a stationary lens barrel 32 by means of a helicoidal thread 34. The lens barrel 32 has an attaching mount 36 to permit it to be fastened to a camera body, not shown. An inner lens barrel 38 is also threadedly attached to the focussing ring 30. The inner lens barrel 38 is further provided with a key groove 40 that is designed to loosely align and guide a linearly advancing key 42 which is attached to the stationary lens barrel 32. Rotatably fitted on the outer periphery of the inner lens barrel 38 is a diaphragm control sleeve 44 having an arm 46 connected to a diaphragm operating pin 48. The diaphragm pin 48 is correspondingly fixed to a diaphragm operating ring 50 which is rotatably supported in the inner lens barrel 38 and carries a diaphragm 52.

The filter optical elements 28 and 29 are affixed to movable supports 54 and 56, respectively, which are adapted to be slid parallel to the optical axis within the inner lens barrel 38.

Appropriate guide pins 58 and 60 project downward on the lower portion of the respective movable support members 54 and 56 to coact with respective cam shape grooves 62 and 64 provided in the inner lens barrel 38. The guide pins 58 and 60 project into respective bores 66 and 68 provided in the inner lens barrel 38. The guide pins 58 and 60 are fitted in guide holes 70 and 72 provided respectively on the integral alignment arms 74 and 76. The arms 74 and 76 extend parallel to the optical axis respectively into the bores 66 and 68. The alignment arms 74 and 76 are further attached to an operating ring 78 for controlling the movement of the optical filter elements 28 and 29 for varying the distribution of in point image intensity. The operating ring 78 is rotatably mounted on the outer periphery of the inner lens barrel 38.

Means are provided on the inner lens barrel 38 for permitting an adjustment of the position of the respective optical filter elements 28 and 29 in correlation with the adjustment of the diaphragm control sleeve 44. The adjustment means includes a lineally movable button member 80 that is provided with an over center or click mechanism which includes indented grooves 82 on the under side of the button member 80 that are designed to cooperate with an index pin 84 that is biased outward by a spring 86. The button member 80 is capable of interconnecting the operating ring 78 with the diaphragm control sleeve 44. The click or change over button 80 is shifted parallel to the optical axis and carries a projection member 88 that is adapted to be brought into engagement with an indent 90 on the diaphragm control sleeve 44. The projection member 88 will only engage the indent 90 when the button member 80 is moved rearwardly or towards the image side of the lens system.

In operation, the optical filter elements 28 and 29 will be moved respectively to the positions (a1) and (a2) disclosed in the schematic view of FIG. 8 whereby they are effectively removed from the light flux of the lens system. In this position, the focussing ring 30 can be operated to move the inner lens barrel 38 either rearwardly or frontwardly in the direction of the optical axis for focussing the optical system. The diaphragm aperture of the optical system can be set by turning the diaphragm control sleeve 44. The filter operating ring 78 can be then rotated to vary the distribution in point image intensity as desired, by shifting the filter optical elements 28 and 29 via the interaction of the cam grooves 62 and 64 with the guide pins 56 and 58.

Alternatively, the button member 80 can be positioned to engage the projecting member 88 with the indent 90 on the diaphragm control sleeve 44. Thus, when the diaphragm control sleeve 44 is adjusted, the distribution in point image intensity will also be automatically adjusted.

The relative positions of the filter optical elements 28 and 29 and their respective peripheral coatings or refractive powers will be subjectively determined according to the desired parameters of the optical system and accordingly the present invention should not be limited to only the specific examples disclosed herein. The following example of an optical lens system is given merely by way of illustration. In the following F number = 2.5; angle of view ($2\omega$) = 24°, 24' and the back focal length = 0.328.

| | RADIUS | THICKNESS | REFRACTIVE INDEX | ABBE NO. |
|---|---|---|---|---|
| $L_1$ | $r_1=0.633$ | $d_1=0.072$ | $N_1=1.6779$ | $V_1=55.5$ |
| | $r_2=2.904$ | $d_2=0.002$ | | |

-continued

| RADIUS | THICKNESS | REFRACTIVE INDEX | ABBE NO. |
|---|---|---|---|
| $r_3$=0.371 (L₂) | $d_3$=0.014 | $N_2$=1.6727 | $V_2$=32.1 |
| $r_4$=0.229 (L₃) | $d_4$=0.115 | $N_3$=1.6779 | $V_3$=55.5 |
| $r_5$=0.732 | $d_5$=0.030 | | |
| $r_6$=* (F₂₀) | $d_6$=0.070 | $N_4$=1.5168 | $V_4$=64.2 |
| $r_7$=∞ | $d_7$=0.052 | | |
| $r_8$=1.112 (L₄) | $d_8$=0.030 | $N_5$=1.66446 | $V_5$=35.7 |
| $r_9$=0.220 | $d_9$=0.200 | | |
| $r_{10}$=* (F₂₀) | $d_{10}$=0.010 | $N_6$=1.5168 | $V_6$=64.2 |
| $r_{11}$=∞ | $d_{11}$=0.030 | | |
| $r_{12}$=−0.290 (L₅) | $d_{12}$=0.020 | $N_7$=1.574 | $V_7$=39.1 |
| $r_{13}$=−0.493 | $d_{13}$=0.004 | | |
| $r_{14}$=1.032 (L₆) | $d_{14}$=0.060 | $N_8$=1.70154 | $V_8$=41.1 |
| $r_{15}$=−0.602 | | | |

*Aspheric
$d_{rel.}$=0.649

The aspheric surfaces in the above table are for the sixth and tenth surfaces on the optical filter elements and the coefficient for the tenth power, $C_{10}$, of aspheric surface for the surfaces are as follows:

| Surface | Refractive Power | |
|---|---|---|
| | Positive refractive power | Negative refractive power |
| 6 | $0.18 \times 10^{-13}$ | $-0.18 \times 10^{-13}$ |
| 10 | $0.9 \times 10^{-12}$ | $-0.9 \times 10^{-12}$ |

As can be readily appreciated, it is possible to deviate from the above embodiments of the present invention and will be readily understood by those skilled in the art that the invention is capable of many modifications and improvements within the scope and spirit thereof. Accordingly, it will be understood that the invention is not to be limited by the specific disclosed embodiment but only by the scope and spirit of the appended claims.

What is claimed is:

1. In a lens system having a plurality of lens components arranged on an optical axis for refracting transmitted light rays non-parallel to the optical axis, the improvement comprising:
at least one optical element positioned on the image space side of the lens components and capable of intersecting the refracted light rays traveling non-parallel through the lens system; and
means for moving the optical element along the optical axis, said optical element including a marginal area having a characteristic of influencing the transmission of a light ray passing therethrough and an inner area having a characteristic of transmitting any incident light ray with substantially no influence on the properties of the light ray, the axial movement of said optical element varying the amount of light rays transmitted non-parallel to the optical axis which pass through said marginal area of said optical element.

2. The lens system of claim 1 wherein said optical element is movable between first position wherein all of the incident light rays pass through said inner area of the optical element and a second position wherein the marginal light rays pass through said marginal area of the optical element.

3. The lens system of claim 2 wherein said marginal area has a positive refractive power and said inner area has no refractive power.

4. The lens system of claim 2 wherein said marginal area has a negative refractive power and said inner area has no refractive power.

5. The lens system of claim 2 wherein said marginal area has relatively higher light absorbing characteristic than that of the inner area.

6. The lens system of claim 2 wherein said marginal area has a light diffusing characteristic and said inner area has a light transparent characteristic.

7. The lens system of claim 2 wherein said optical element is movably mounted in said lens system where the transmitted light rays are convergent in said lens system.

8. The lens system of claim 2 wherein said optical element is movably mounted in said lens system where the light rays are non-parallel to the optical axis of said lens system.

9. The lens system of claim 2 further comprising a second movably mounted optical element having the same marginal area and inner area characteristics as the first optical element.

10. The lens system of claim 9 wherein said two optical elements are interlocked for joint movement.

11. The lens system of claim 10 wherein said two optical elements have a positive refractive power in their marginal areas and have no refractive power in their inner areas.

12. The lens system of claim 10 wherein said two optical elements have a negative refractive power in their marginal areas and have no refractive power in their inner areas.

13. The lens system of claim 9 wherein one of said optical elements is movably mounted in said lens system where the transmitted light rays are convergent in said lens system.

14. The lens system of claim 9 wherein one of said optical elements is movably mounted in said lens system where the light rays are non-parallel to the optical axis of said lens system.

15. The lens system of claim 2 further comprising a diaphragm aperture and said optical element is automatically movable in accordance with any adjustment of the size of said diaphragm aperture.

16. A photographic object lens assembly with at least one lens having an optical axis and providing an image plane for transmitted rays for forming a composite image of objects at various distances from the lens assembly including at least one defocussed image formed off of the focal plane comprising:
an optical filter element having a central region capable of passing the transmitted rays substantially free of refraction and a peripheral region having a filter characteristic of improving the photographic image of the defocussed image by decreasing the transmitted image point intensity of the defocussed image; and mounting means for moving the optical filter element relative to the lens along the optical axis for a predetermined range of movement, the range of movement including one position wherein the central region transmits all of the rays and the lens assembly forms substantially unfiltered images.

17. The invention of claim 16 wherein the peripheral region has a divergent refractive power to improve defocussed images behind the image plane relative to the lens assembly.

18. The invention of claim 16 wherein the peripheral region has a convergent refractive power to improve defocussed images in front of the image plane relative to the lens assembly.

19. The invention of claim 16 wherein the peripheral region absorbs transmitted rays to vary the image point intensity.

20. The invention of claim 16 further including a diaphragm within the lens assembly;
means for controlling the aperture of the diaphragm and means for interconnecting the mounting means for the optical filter element with the diaphragm control means to permit the coordinate adjustment of both the filter element and the diaphragm aperture.

21. The invention of claim 20 wherein the means for interconnecting the mounting means includes a manually slidable member for interlocking the diaphragm control means and mounting means.

22. A lens system having a plurality of lens components including a pair of optical filter element having a central region capable of passing the transmitted rays substantially free of refraction and a peripheral region having a refractive power, the parameters of the lens system being as follows;

| RADIUS | THICKNESS | REFRACTIVE INDEX | ABBE NO. |
|---|---|---|---|
| $r_1=0.633$ | $d_1=0.072$ | $N_1=1.6779$ | $V_1=55.5$ |
| $r_2=2.904$ | $d_2=0.002$ | | |
| $r_3=0.371$ | $d_3=0.014$ | $N_2=1.6727$ | $V_2=32.1$ |
| $r_4=0.229$ | $d_4=0.115$ | $N_3=1.6779$ | $V_3=55.5$ |
| $r_5=0.732$ | $d_5=0.030$ | | |
| $r_6=*$ | $d_6=0.070$ | $N_4=1.5168$ | $V_4=64.2$ |
| $r_7=\infty$ | $d_7=0.052$ | | |
| $r_8=1.112$ | $d_8=0.030$ | $N_5=1.66446$ | $V_5=35.7$ |
| $r_9=0.220$ | $d_9=0.200$ | | |
| $r_{10}=*$ | $d_{10}=0.010$ | $N_6=1.5168$ | $V_6=64.2$ |
| $r_{11}=\infty$ | $d_{11}=0.030$ | | |
| $r_{12}=-0.290$ | $d_{12}=0.020$ | $N_7=1.574$ | $V_7=39.1$ |
| $r_{13}=-0.493$ | $d_{13}=0.004$ | | |
| $r_{14}=1.032$ | $d_{14}=0.060$ | $N_8=1.70154$ | $V_8=41.1$ |
| $r_{15}=-0.602$ | | | |

*Aspheric
$d_{tot}=0.649$.

23. In a lens system having a plurality of lens components arranged on an optical axis including a front lens component, the plurality of lens components being designed to provide a predetermined range of light path on the image space side of the front lens component so that light rays coming from a point of an object at infinity on the optical axis are non-parallel with the optical axis, the improvement comprising:

at least one optical element movable in the predetermined range of light path along the optical axis, the optical element including a marginal area having a characteristic of influencing the transmission of a light ray passing therethrough and an inner area having a characteristic of transmitting any incident light ray with substantially no influence on the properties of the light ray; and means for moving the optical element, the radius of the inner area of the optical element being smaller than the largest radius of an on-axial pencil ray trace, which is formed in the predetermined range by the light rays from the point of an object, a portion of the light rays from the point of the object being capable of passing through the marginal area and the amount of that portion of light rays is variable by the axial movement of the optical element.

* * * * *